(12) United States Patent
Ashihara

(10) Patent No.: US 6,414,623 B1
(45) Date of Patent: Jul. 2, 2002

(54) RADAR SYSTEM MOUNTED ON VEHICLE AND CAPABLE OF DETECTING DEGRADATION OF SENSITIVITY

(75) Inventor: Jun Ashihara, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/528,725

(22) Filed: Mar. 20, 2000

(30) Foreign Application Priority Data

May 17, 1999 (JP) ............................................. 11-135213

(51) Int. Cl.[7] ............................. G01S 13/93; G01S 7/03
(52) U.S. Cl. ............................................. 342/70; 342/173
(58) Field of Search ............................. 342/70, 71, 72, 342/165, 173; 180/167, 168, 169

(56) References Cited

U.S. PATENT DOCUMENTS 5,485,159 A * 1/1996 Zhang et al. ................ 342/165
5,565,870 A * 10/1996 Fukuhara et al. ............. 342/70

FOREIGN PATENT DOCUMENTS

| JP | 60-173084 | 11/1985 |
| JP | 6-59024 | 3/1994 |
| JP | 10-282229 | 10/1998 |

* cited by examiner

Primary Examiner—Ian J. Lobo
(74) Attorney, Agent, or Firm—Carrier, Blackman & Associates, P.C.; Joseph P. Carrier; William D. Blackman

(57) ABSTRACT

A radar system mounted on a vehicle includes a radar apparatus, a radome provided for the radar apparatus, a front wiper, a wiper operation detector detecting an operation of the front wiper, a temperature detector detecting temperature outside of the vehicle, and a processing unit. The processing unit estimates whether sensitivity degradation of the radar apparatus is caused, based on the detecting result of the wiper operation detector and the detecting result of the temperature detector.

26 Claims, 4 Drawing Sheets

RADAR SYSTEM MOUNTED ON VEHICLE AND CAPABLE OF DETECTING DEGRADATION OF SENSITIVITY

BACKGROUND OF THE INVENTION

1. Field of the Invention

The present invention relates to a radar system, and more particularly to a radar system which is mounted on a vehicle and which can detect degradation of the sensitivity of a radar apparatus.

2. Description of the Related Art

A radar system mounted on a vehicle has conventionally come into a practical use for the purpose of detection of any obstacle to prevent the vehicle from colliding with the obstacle around the vehicle in running in a narrow alley or putting the vehicle in a garage. Also, in recent years, a radar system has been developed to catch a detection object in a relatively long distance from the vehicle at a high speed in a high precision as a warning apparatus to prevent the vehicle from colliding with a preceding vehicle or as an Adaptive Cruise Control (ACC) to control the vehicle to run while keeping a distance to the preceding vehicle constant.

Here, a radar apparatus of the above radar system mounted on the vehicle is generally installed in a bumper section of the vehicle or a front grill in a front portion of the vehicle. Therefore, it is easy for snow to accrete on a radome of the radar apparatus in case of snowfall. Also, when snow containing much water accretes, the transmission loss of radar wave becomes large. Therefore, the detection sensitivity of the radar system reduces uniformly over all the azimuth directions, so that the distance measuring range of a detection object becomes short.

For this reason, in Japanese Laid Open Utility Model Application (JP-U-Showa 60-173084: a first conventional example), a temperature sensor and a water sensor are provided for the radome of the radar apparatus. An electric current is supplied to a resistor, which is provided for the radome, based on the detection results of the sensors to melt snow and ice. In this way, the sensitivity degradation of the radar system due to snow or ice is prevented.

Also, in Japanese Laid Open Patent Application (JP-A-Heisei 6-59024: a second conventional example), a plurality of electrodes are provided on the whole surface of a radome of a radar apparatus. A voltage or current between these electrodes is detected. In this way, ice formation or adhesion of muddy water on the radome surface is detected.

However, in the radar systems of the first and second conventional examples, the structure of the radome or the radar system becomes complicated to increase the cost of the radar system.

Also, the degree of the sensitivity degradation of the radar system depends on a quality of snow accretion on the radome. Also, even if the accreted snow is melt into water with the heat by a heater provided for the radome or the radiation heat from an engine once, the water sometimes froze again during the running of the vehicle. In this way, the accretion situation of snow and ice changes dependent on the running state of the vehicle. It is difficult to prevent the sensitivity degradation of the radar system due to snowfall by only the measure based on the surface temperature of the radome and the local wetting situation.

In conjunction with the above description, an FM radar apparatus is described in Japanese Laid Open Patent Application (JP-A-Heisei 10-282229). In this reference, a transmission FM signal and a reception FM signal are mixed to obtain a beat signal (10a). A low frequency component of the beat signal (10a) is filtered by a low pass filter (12), A/D converted by a converter (13), and then is subjected to a fast Fourier transformation (FFT) by an FFT converter (14) to produce a detection signal. A control unit (15) compares the detection signal and a corresponding stored signal to detect contamination of a radome (8). The control unit (15) increases a frequency change quantity of a FM signal per a unit time on the detection of the contamination. Thus, the contamination of the radome is detected without providing any sensor to the radome.

SUMMARY OF THE INVENTION

Therefore, an object of the present invention is to provide a radar system which can estimate existence or non-existence of accretion of snow or ice.

Another object of the present invention is to provide a radar system which can estimate a melting state of an accreted snow or ice.

Still another object of the present invention is to provide a radar system which can estimate the sensitivity degradation of a radar apparatus.

Yet still another aspect of the present invention is to provide a radar system in which the accreted snow or ice can be removed when the sensitivity degradation of a radar apparatus is estimated.

It is an object of the present invention to provide a radar system in which the sensitivity degradation of the radar system can be prevented with a simple structure.

Another object of the present invention is to provide a method of keeping the sensitivity of a radar apparatus in the above radar systems.

In order to achieve an aspect of the present invention, a radar system mounted on a vehicle includes a radar apparatus, a radome provided for the radar apparatus, a front wiper, a wiper operation detector detecting an operation of the front wiper, a temperature detector detecting temperature outside of the vehicle, and a processing unit. The processing unit estimates whether sensitivity degradation of the radar apparatus is caused, based on the detecting result of the wiper operation detector and the detecting result of the temperature detector.

Here, the radar system mounted on a vehicle may further include an output unit. At this time, the processing unit notifies that the sensitivity degradation of the radar apparatus is caused, to, a driver via the output unit based on the estimating result.

Also, the radar system mounted on a vehicle may further include a radome heater provided for the radome, and a radome heater control circuit controlling the radome heater to be turned on in response to a heater control signal. At this time, the processing unit outputs the heater control signal to the radome heater control circuit when it is estimated that the sensitivity degradation of the radar apparatus is caused.

Also, the radar system mounted on a vehicle may further include a radome wiper provided for the radome, and a radome wiper control circuit controlling the radome wiper to be turned on in response to a wiper control signal. At this time, the processing unit outputs the wiper control signal to the radome wiper control circuit when it is estimated that the sensitivity degradation of the radar apparatus is caused.

Also, the processing unit may include a first counter, a first estimating section, a second estimating section. The first estimating section estimates whether snow falls, based on the detecting result of the wiper operation detector and the detecting result of the temperature detector, and increments the first counter when it is estimated that the snow falls. The second estimating section estimates whether the sensitivity degradation of the radar apparatus is caused, based on a value of the first counter. In this case, the processing unit further include a second counter. At this time, the first estimating section estimates whether sleet falls, based on the detecting result of the wiper operation detector and the detecting result of the temperature detector, and increments the second counter when it is estimated that the sleet falls. The second estimating section estimates whether the sensitivity degradation of the radar apparatus is caused, based on the first counter value and a value of the second counter. Also, in this case, the first estimating section estimates whether rain falls, based on the detecting result of the wiper operation detector and the detecting result of the temperature detector. Also, the first estimating section decrements the first and second counters by first and second values, respectively, and also increments the second counter by a third value, when it is estimated that the rain falls. The second estimating section estimates whether the sensitivity degradation of the radar apparatus is caused, based on the first counter value and a value of the second counter.

In order to achieve another aspect of the present invention, a radar system mounted on a vehicle includes a radar apparatus, a radome provided for the radar apparatus, a speed detector detecting a running speed of the vehicle, a front wiper, a wiper operation detector detecting an operation of the front wiper, an temperature detector detecting temperature outside of the vehicle, and a processing unit. The processing unit estimates whether sensitivity degradation of the radar apparatus is caused, based on the detecting result of the wiper operation detector, the detecting result of the temperature detector, and the detecting result of the speed detector.

Here, the radar system mounted on a vehicle may further include an output unit. At this time, the processing unit notifies that the sensitivity degradation of the radar apparatus is caused, a driver via the output unit based on the estimating result.

Also, the radar system mounted on a vehicle may further include a radome heater provided for the radome, and a radome heater control circuit controlling the radome heater to be turned on in response to a heater control signal. At this time, the processing unit outputs the heater control signal to the radome heater control circuit when it is estimated that the sensitivity degradation of the radar apparatus is caused.

Also, the radar system mounted on a vehicle may further include a radome wiper provided for the radome, and a radome wiper control circuit controlling the radome wiper to be turned on in response to a wiper control signal. At this time, the processing unit outputs the wiper control signal to the radome wiper control circuit when it is estimated that the sensitivity degradation of the radar apparatus is caused.

Also, the processing unit includes a first counter, a first estimating section and a second estimating section. The first estimating section determines whether the vehicle runs faster than a predetermined speed, and estimates whether snow falls, based on the detecting result of the wiper operation detector and the detecting result of the temperature detector. Also, the first estimating section increments the first counter when it is determined that the vehicle runs faster and when it is estimated that the snow falls, and decrements the first counter when it is determined that the vehicle does not run faster. The second estimating section estimates whether the sensitivity degradation of the radar apparatus is caused, based on a value of the first counter. In this case, the processing unit may further include a second counter. At this time, the first estimating section estimates whether sleet falls, based on the detecting result of the wiper operation detector and the detecting result of the temperature detector. Also, the first estimating section increments the second counter when it is estimated that the sleet falls. Moreover, the first estimating section decrements the first and second counters and increments the second counter by a quantity corresponding to the decrement of the first counter, when it is determined that the vehicle does not run faster. The second estimating section estimates whether the sensitivity degradation of the radar apparatus is caused, based on the first counter value and a value of the second counter. Further, the first estimating section estimates whether rain falls, based on the detecting result of the wiper operation detector and the detecting result of the temperature detector. Also, the first estimating section decrements the first and second counters by first and second values, respectively, and also increments the second counter by a third value, when it is estimated that the rain falls or when it is determined that the vehicle does not run faster. The second estimating section estimates whether the sensitivity degradation of the radar apparatus is caused, based on the first counter value and a value of the second counter.

In order to still another aspect of the present invention, a method of keeping a sensitivity of a radar apparatus mounted on a vehicle, is attained by incrementing or decrementing first and second counters based on weather and running speed of the vehicle, the first counter indicating a snow accretion on a radome for the radar apparatus and the second counter indicating an ice on the radome, by comparing a value of each of the first and second counters with at least one threshold value, and by removing snow or ice from radome based on the comparing result.

Here, the method may further include a step of notifying to a driver that the sensitivity degradation of the radar apparatus is caused, based on the comparing result.

Also, the removing step may be attained by heating a radome heater provided for the radome. Instead, the removing step may be attained by driving a radome wiper provided for the radome.

Also, each of the first and second counters may be provided a plurality of threshold values. At this time, the removing step may be attained by activating at least one of a radome heater and a radome wiper which are both provided for the radome, based on the first and second counter values and the plurality of threshold values.

Also, the incrementing or decrementing step may be attained by detecting temperature outside of the vehicle, by estimating whether or not snow falls, whether or not sleet falls, whether or not rain falls to detect a falling state of snow, sleet or rain, by detecting the running speed of the vehicle, and by incrementing or decrementing the first and second counters based on the running speed of the vehicle, the temperature and the falling state. In this case, the estimating step may be attained by detecting an operation of a front wiper, and by detecting the falling state based on the detected operation of the front wiper and the temperature.

Here, the incrementing or decrementing step may be attained by decrementing the first and second counter by first and second values, respectively, when the vehicle does not run faster than a predetermined speed, and by incrementing the second counter by a third value, when the vehicle does not run faster than the predetermined speed.

Also, the incrementing or decrementing step may be attained by decrementing the first and second counter by first and second values, respectively, when the temperature is higher faster than a predetermined temperature, and by incrementing the second counter by a third value, when the temperature is higher faster than the predetermined temperature.

Also, the incrementing or decrementing may be attained by incrementing the first counter when the vehicle runs faster than the predetermined speed and when snow falls.

Also, the incrementing or decrementing step may be attained by incrementing the second counter when the vehicle runs faster than the predetermined speed and when sleet falls.

Also, the incrementing or decrementing step may be attained by decrementing the first and second counter by first and second values, respectively, when the vehicle runs faster than a predetermined speed and when rain falls, and by incrementing the second counter by a third value, when the vehicle runs faster than the predetermined speed and when rain falls.

DESCRIPTION OF THE PREFERRED EMBODIMENTS

Hereinafter, a radar system of the present invention will be described with reference to the attached drawings.

Figure 1:
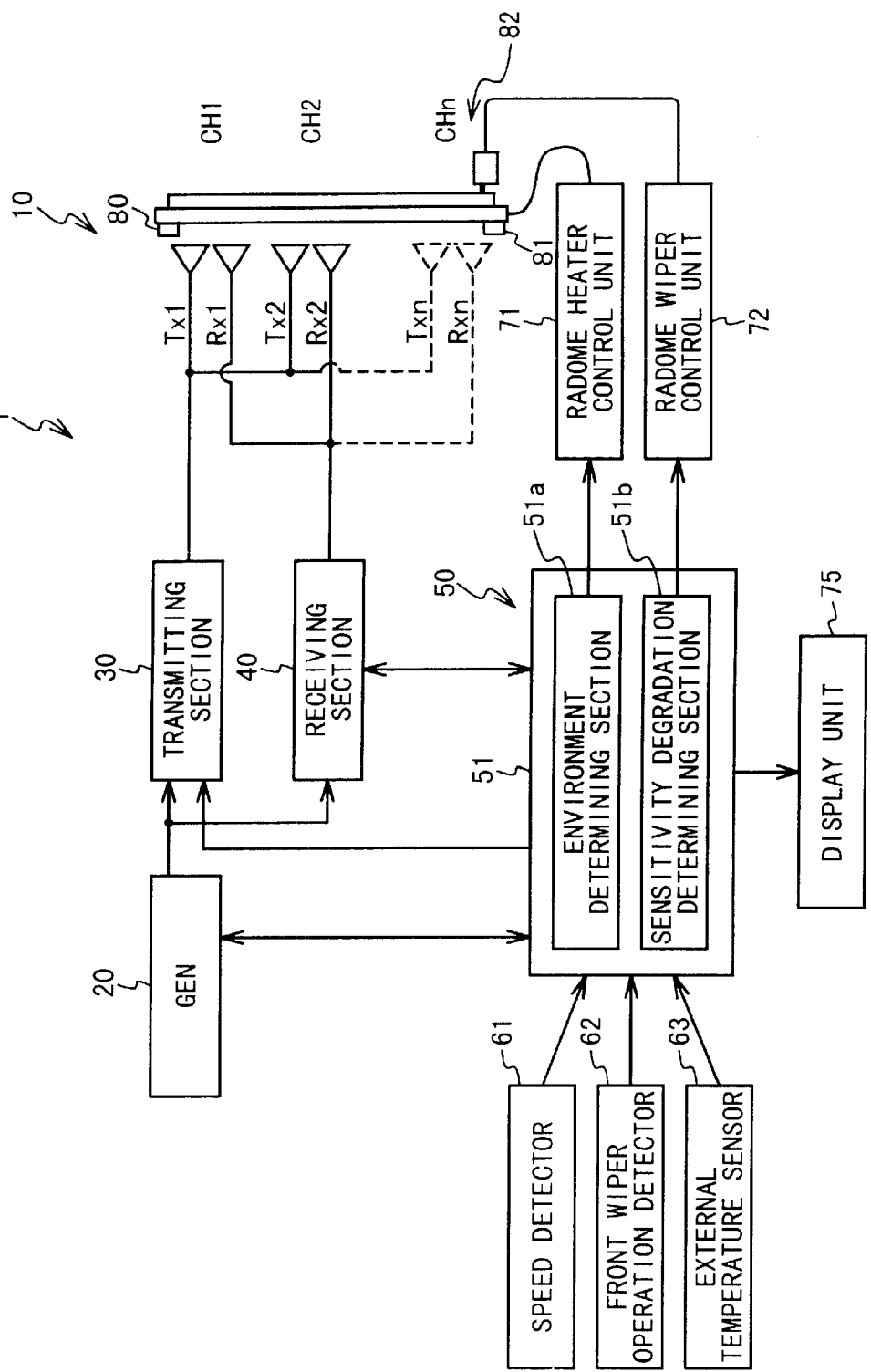
FIG. 1 is a block diagram showing the structure of a radar system mounted on a vehicle of the present invention.

FIG. 1 is a block diagram showing the structure of the radar system according to an embodiment of the present invention. Referring to FIG. 1, the radar system is composed of a radar apparatus, a speed detector 61, a front wiper operation detector 62, a temperature sensor 63, a display unit 75, a radome heater control unit 71, a radome wiper control unit 72, a radome 80, a radome heater 81 and a radome wiper 82.

Figure 4:
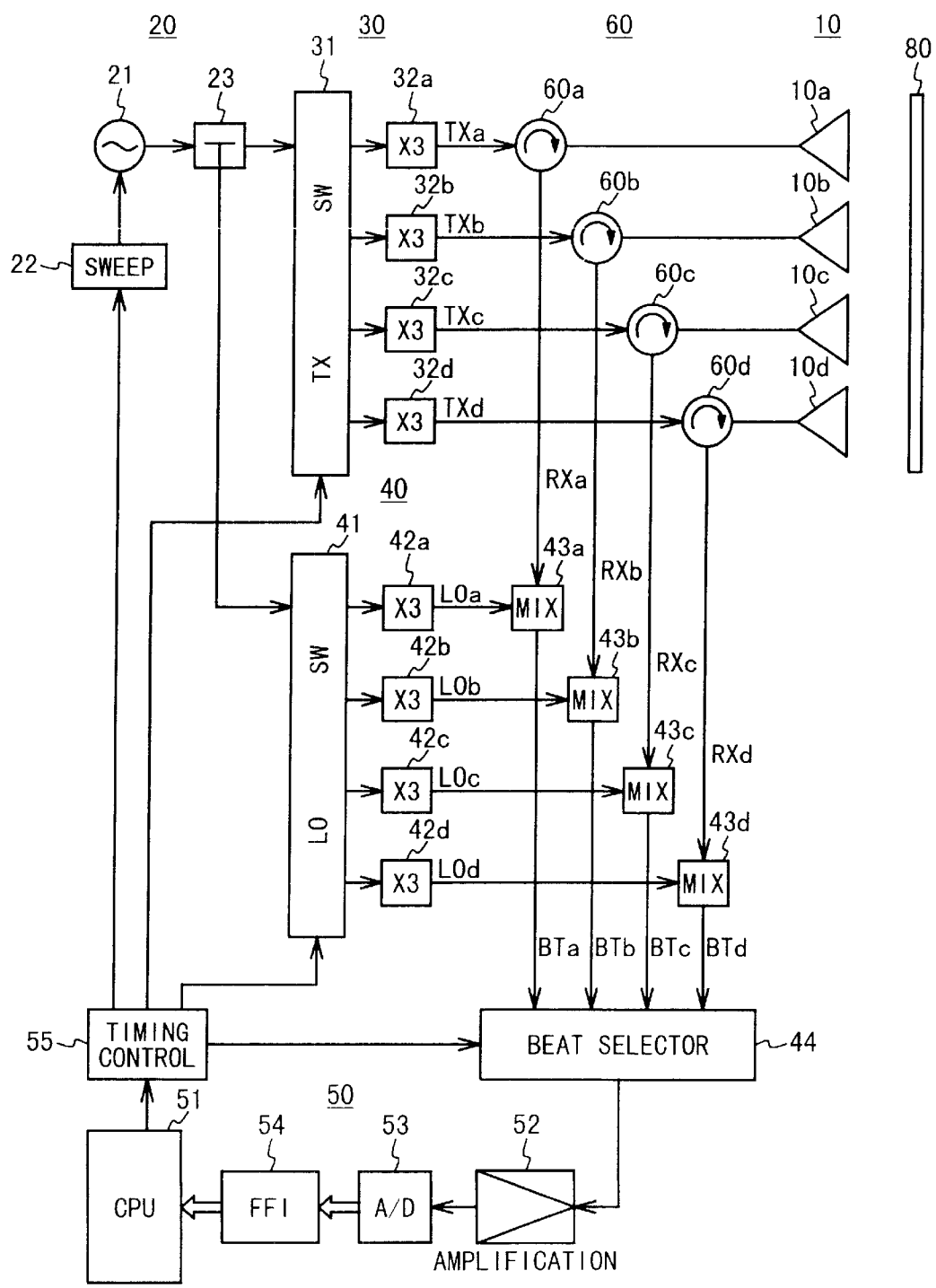
FIG. 4 is a block diagram showing the structure of a radar apparatus in the radar system of the present invention.

FIG. 4 is a block diagram showing the structure of the radar apparatus in the radar system of the embodiment. FIG. 4 shows an FM-CW multi-beam radar apparatus of a time division type. First, referring to FIG. 4, the structure of the radar apparatus will be described. The radar apparatus is composed of an antenna section 10, an FM wave generating circuit 20, a transmitting section 30, a receiving section 40, a processing section 50, and a directional coupler section 60.

The antenna section 10 is composed of antennas 10a to 10d which are formed as an offset defocus parabolic multi-beam antenna which has beam radiation patterns overlapping spatially.

The FM wave generating circuit 20 is composed of a voltage controlled oscillator 21, a sweep circuit 22, and a power distributing circuit 23. The sweep circuit 22 generates a triangular waveform-shaped modulation voltage under the control of the processing section 50 to supply to the voltage controlled oscillator 21. The voltage controlled oscillator 21 generates a radio wave at the semi-millimeter wave band of about 20 GHz or about 25 GHz as a modulated power signal based on the triangular waveform-shaped modulation voltage. The power distributing circuit 23 distributes the power signal into the transmitting section 30 and the receiving section 40.

The transmitting section 30 is composed of a transmission switching circuit 31 and frequency increasing circuits 32a to 32d. The transmission switching circuit 31 switches the modulated power signal toward the respective antennas 10a to 10d at predetermined timings specified by a timing control signal from the processing section 50. Each of the frequency increasing circuits 32a to 32d increases the frequency of the modulated power signal 3 times to convert into FM wave at the millimeter wave band of about 60 GHz or about 75 GHz. The modulated power signals from the frequency increasing circuits 32a to 32d are transferred to the respective antennas 10a to 10d via four directional couplers 60a to 60d of the directional coupler section 60, and radiated from the antennas 10a to 10d, respectively.

The receiving section 40 is composed of a local switching circuit 41, frequency increasing circuits 42a to 42d, mixing circuits 43a to 43d and a beat selector 44. The local switching circuit 41 switches the modulated power signal distributed by the power distributing circuit 23 toward the respective mixing circuits 43a to 43d at predetermined timings specified by a timing control signal from the processing section 50. Each of the frequency increasing circuits 42a to 42d converts the frequency of the modulated power signal into the same frequency as the transmitted modulated power signal. The modulated power signal radiated from the antennas 10a to 10d are reflected by a detection object. The reflected signals are received by the antennas 10a to 10d and supplied to the mixing circuits 43a to 43d through the directional couplers 60a to 60d, respectively. The mixing circuits 43a to 43d mix the reflected signals and the modulated power signals supplied from the frequency increasing circuits 42a to 42d and the mixed signals are supplied to the beat selector 44. The beat selector 44 selects a component of the mixed signals in response to a timing control signal from the processing section 50.

The processing section 50 is composed of a processor (CPU) 51a, an amplifier circuit 52, an analog to digital (A/D) converting circuit 53, a Fast Fourier transform circuit (FFT) 54 and a timing control circuit 55. The timing control circuit 55 generates the timing control signals in response to a control signal from the processor 51 to supply to the sweep circuit 22, the transmission switching circuit 31, the local switching circuit 41 and the beat selector 44. The amplifier circuit 52 amplifies the signal component selected by the beat selector 44. The analog to digital (A/D) converting circuit 53 converts the amplified signal by the amplifier circuit 52 into a digital signal. The fast Fourier transform circuit 54 performs the fast Fourier transformation to the digital signal and supplies the transformation result to the processor 51. The processor 51 detects the position of the detection object.

The radar waves Txa to Txd are increased in frequency to the FM waves at the millimeter wave band of 60 GHz, for example. Then, the radar waves Txa to Txd are supplied to the antennas 10a to 10d through the directional couplers 60a to 60d at different timings and are radiated from the antennas 10a to 10d through the radome 80 toward the detection object, respectively.

The radiated radar waves Txa to Txd are reflected by the detection object and are received by the antennas 10a to 10d through the radome 80 as reflected waves Rxa to Rxd, respectively. The reflected waves Rxa to Rxd are separated from the transmission waves by the directional couplers 60a to 60d and supplied to the mixing circuit 43a to 43d, respectively. The modulated power signals are increased to 3 times in frequency by the frequency increasing circuits 42a to 42d and converted into the local FM modulated waves Loa to Lod. The separated waves Rxa to Rxd are synthesized with the local FM modulated waves Loa to Lod at predetermined timings in the mixing circuits 43a to 43d. As a result, beat signals Bta to Btd are generated as the synthetic signals. The beat selector 44 sequentially selects the beat signals Bta to Btd outputted from the mixing circuits 43a to 43d to output to the control circuit 50.

The selected beat signal Bta to Btd is amplified by the amplifier circuit 52 and then are converted into the digital signal by the analog to digital conversion circuit 53. Moreover, the digital signal is converted by the fast Fourier transform circuit (FFT) 54. Then, the signal subjected to the fast Fourier transform is outputted to the processor (CPU) 51 as the power spectrum which has peak components at the frequencies which corresponds to the beat frequencies. The beat signals Bta to Btd, i.e., the frequency difference between the transmission radar wave and the reception radar wave indicates a propagation delay time. When the frequency difference is small, the detection object is near to the vehicle. Also, when the frequency difference is large, the detection object is far apart from the vehicle. Thus, the distance to the detection object can be calculated by analyzing the frequency of each beat signal.

The processor 51 calculates the propagation delay time of the FM wave to the peak frequency for each of components of the inputted power spectrum which has power intensity higher than a predetermined level. The processor 51 calculates a distance to the detection object based on the calculated propagation delay times for the respective components. Also, the processor 51 carries out the weighting and averaging calculation to the peak intensities of the components of the power spectrum to calculate the azimuth of the detection object. Thus, the position and azimuth of the detection object are calculated.

It should be noted that as shown in FIG. 4, the radar beams Ba to Bd are provided to overlap spatially. Also, the switching timings of the transmission switching circuit 31 and local switching circuit 41 are suitably set. Thus, the radar apparatus 1 is possible to function as a 7-beam multi-beam radar apparatus by the radar waves of four pairs (the 4-channel structure).

In the radar apparatus having the above mentioned structure, the transmission radar wave penetrates into the radome 80 in front of the antenna section 10 to be transmitted, and the reception radar wave penetrates into the radome 80 to be received. Therefore, when any accretion on the radome 80 attenuates the penetrating radar wave, the detection sensitivity is degraded, i.e., the distance measuring range decreases. Water can be raised as a representative example of the material attenuating the penetrating radar wave, i.e., the material having a high transmission loss to the radar wave. However, when rain drops exist in the form of "water", the rain drops fall down in the weight or are blown out with wind during the running of the vehicle, even if the rain drops accretes on the radome 80. Therefore, the rain drops never forms a thick water film on the radome 80. In this way, the water drops never functions as a loss material which causes the sensitivity degradation of the radar system.

However, when water is in the form of solid like "snow" and "ice", the snow and ice are difficult to fall down in the weight, and the snow accretion increases while the vehicle runs. Also, accreted snow melts with the radiation heat from an engine when the vehicle stops, but the melt snow freezes again during running of the vehicle. In this way, the solid material containing a water component and accreted on the radome 80 is equivalent to a thick water film to degrade the detection sensitivity of the radar system.

For this reasons, the radar system of the present invention shown in FIG. 1 is further composed of the speed detector 61, the front wiper operation detector 62, the external temperature sensor 63, the display unit 75, the radome heater control unit 71, the radome wiper control unit 72, the radome heater 81 and the radome wiper 82, in addition to the above radar apparatus.

The speed detector 61 is provided for the vehicle and detects the running speed of the vehicle. The front wiper operation detector 62 detects the operation of a front wiper which is provided for the front window in the front of a driving seat. For example, the front wiper operation detector 62 detects the ON/OFF state of a wiper switch. The external temperature sensor 63 detects a temperature outside the vehicle. The detection results from the speed detector 61, front wiper operation detector 62, and external temperature sensor 63 are supplied to the processor 51 in the processing section 50.

The radome heater 81 is provided in the peripheral section of the radome 80. The radome heater 81 is turned on by the radome heater control unit 71 in response to a heater control signal from the processor 51. If the radome heater 81 does not degrade the intensity of the transmission radar wave from the antennas 10a to 10d and intensity of the reception radar wave to the antennas 10a to 10d. However, the radome heater 81 may be provided in an optional position of the radome 80, if the penetration of the radar wave is not prevented. Also, the radome wiper 82 is provided for the radome 80. The radome wiper 82 is turned on by the radome wiper control unit 72 in response to a radome wiper control signal from the processor 51.

The processor 51 includes an environment determining section 51a, a sensitivity degradation determining section 51b and three counters. The environment determining section 51a estimates a snowfall situation, a sleet situation, a rainfall situation and a non-falling state from the detection results from the speed detector 61, front wiper operation detector 62, and external temperature sensor 63. The environment determining section 51a increments, decrements or holds each of the three counters based on the estimating result. The sensitivity degradation determining section 51b estimates an influence degree to the radar system in sensitivity degradation based on the values of the three counters. The processor 51 outputs the heater control signal to the radome heater control unit 71 and the radome wiper control signal to the radome wiper control unit 72 based on the estimated results by the sensitivity degradation determining section 51b. Also, the processor 51 displays alarm or warning information of the sensitivity degradation and the operation situation of the radome heater 81 and radome wiper 82 on the display unit 75.

Figure 2:
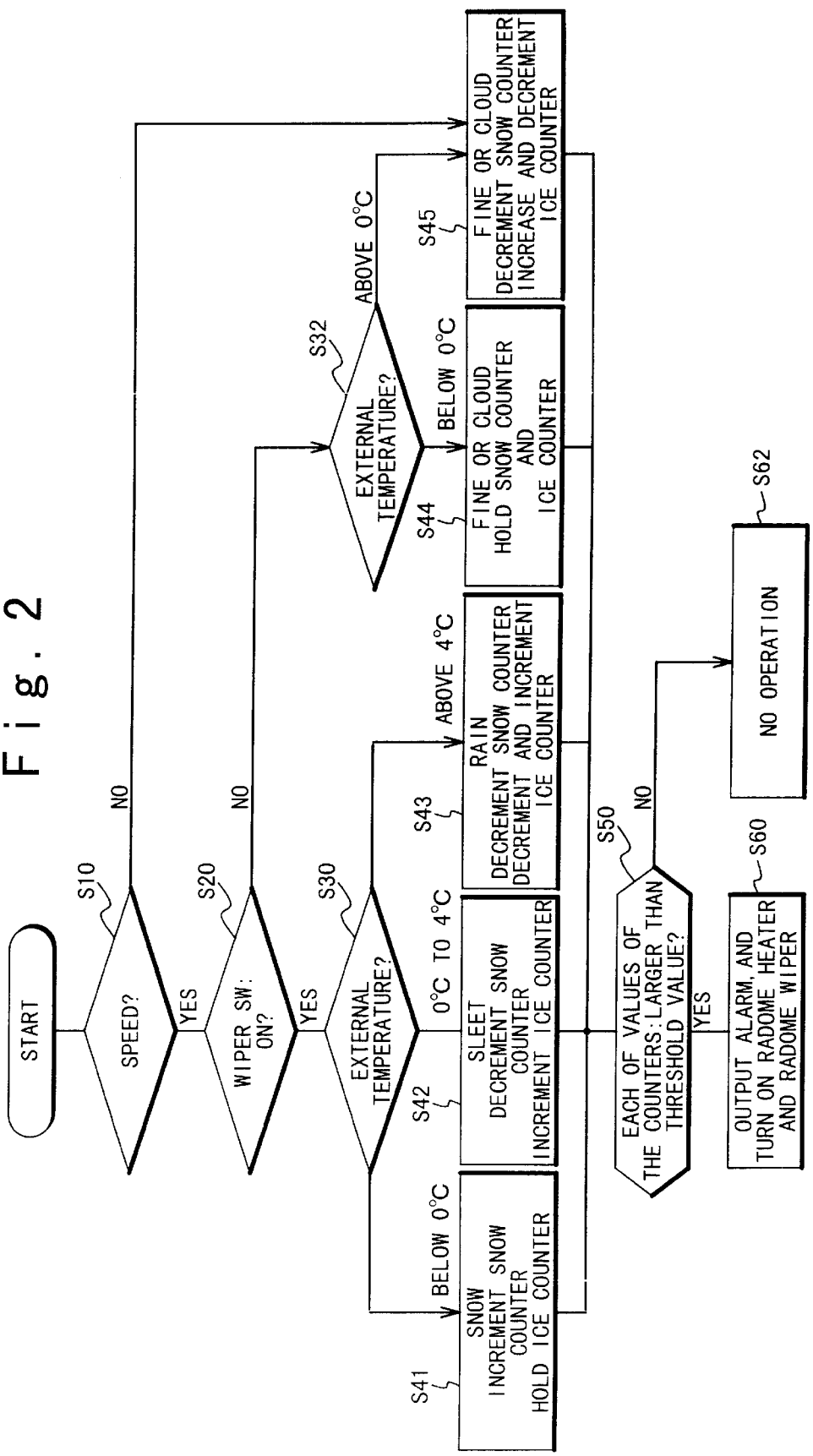
FIG. 2 is a flow chart showing of an operation of the radar system of the present invention.

Next, an operation of the radar system of he present invention will be described with reference to FIG. 2 and FIGS. 3A to 3E. FIG. 2 is flow chart showing the operation of processor 51, which includes the environment determining section 51a and the sensitivity degradation determining section 51b when the detection results of the speed of the vehicle, operation situation of the front wiper, and external temperature are supplied to the processor 51. FIGS. 3A to 3C are the speed of the vehicle, the ON/OFF state of a drive switch of a front wiper, and the external temperature. Also, FIG. 3D shows the determination of the environment determining section 51a and FIG. 3E shows the changes of the values of a snow counter, ice counter and water counter which are provided in the processor 51.

Here, the snow counter value is used for the quantitative evaluation of the snow accretion. The water containing percentage per a volume depends on the quality of snow such as snow and sleet, even if the snow fall. Whether the snow accretion is easily caused and whether the snowfall influences to the sensitivity degradation of the radar system depends on the quality of snow. Therefore, in the present invention, the quality of the falling substance is classified into three types of "snow", "ice") and "water" based on the external temperature on the operation of the front wipers. Three counters (not shown) are provided in the processor 51 in correspondence to three types. Also, a threshold value is given to each of the three types of counters. The three threshold values are different from each other so as to determine allowable limits of the sensitivity degradation of the radar apparatus. The inremental or decremental components of the three counters are different from each other. The accretion situations of snow, ice and water are evaluated based on the counted values of the three counters by the sensitivity degradation determining section 51b. The snow, ice and water counters are incremented in response to a snow counter increment instruction, an ice counter increment instruction and a water counter increment instruction from the environment determining section 51a by the processor 51, respectively. Also, the snow, ice and water counters are decremented in response to a snow counter decrement instruction, an ice counter decrement instruction and a water counter decrement instruction from the environment determining section 51a by the processor 51, respectively.

Figure 3:
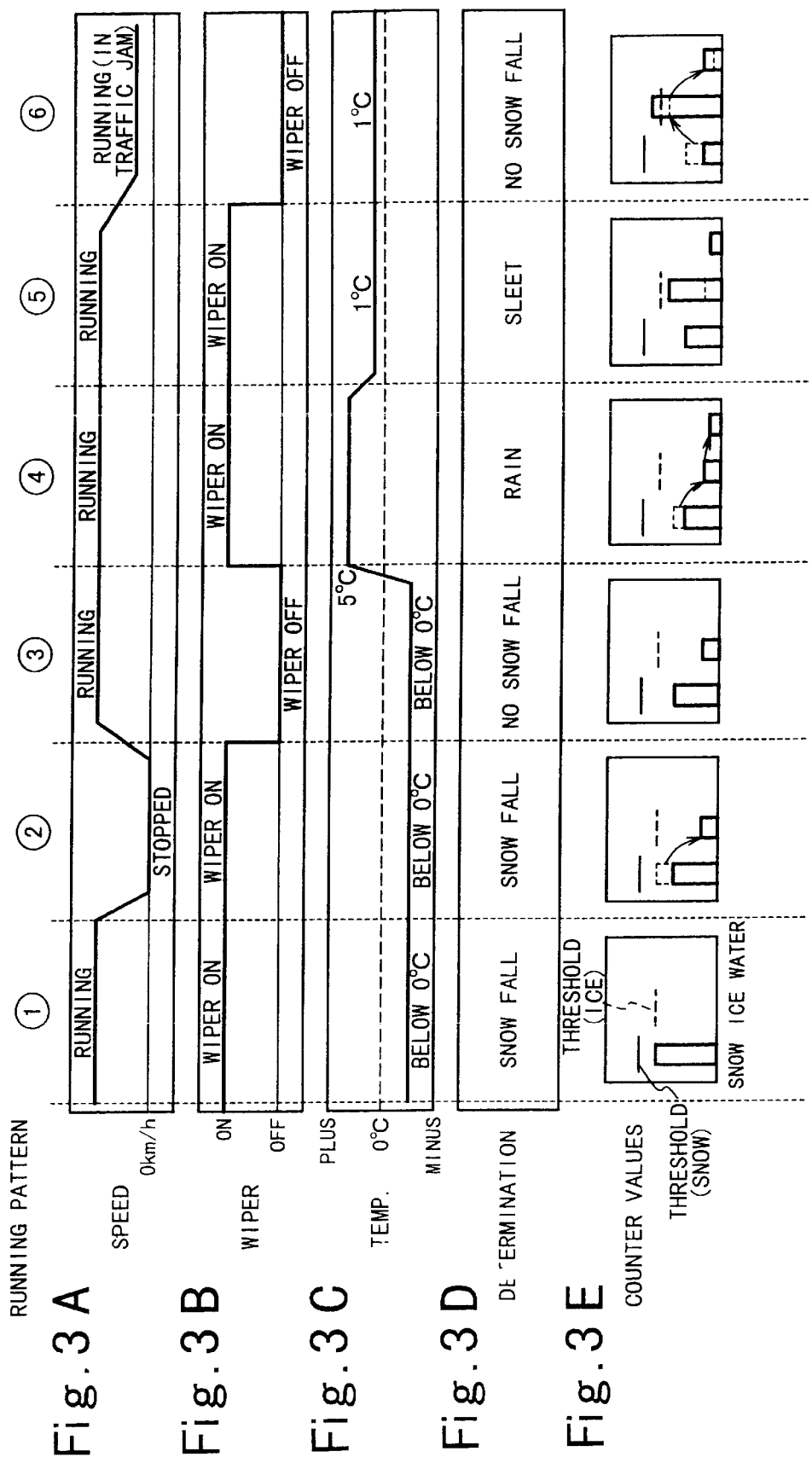
FIG. 3A is a diagram showing the running state of the vehicle.
FIG. 3B is a diagram showing the operation of a front wiper.
FIG. 3C is a diagram showing temperature outside of the vehicle.
FIG. 3D is a diagram showing the determining result of an environment determining circuit.
FIG. 3E is a diagram showing counters.

First, in a running pattern ①, the vehicle is running at the speed which is faster than a predetermined speed, as shown in FIG. 3A. Also, as shown in FIG. 3B, the front wiper is in the on state and the external temperature is equal to or less than 0° C. Therefore, a step S41 is executed through the steps S10, S20 and S30 of the flow of FIG. 2. In step S41, the environment determining section 51a determines that snow falls so that the snow accretes on the radome 80 due to wind on the running, as shown in FIG. 3D. As a result, the environment determining section 51a generates a snow counter increment instruction. The processing unit 51 increments the snow accretion counter based on the running time of the vehicle in response to the snow counter increment instruction. As shown in FIG. 3E in the time of running pattern ①, the snow accretion counter value is less than the threshold value given to the snow counter. Therefore, the sensitivity degradation determining section 51b determines that the sensitivity degradation of the radar apparatus is not caused (Step S50). Subsequently, the control returns to the start without generating an alarm (step S62).

Next, in a running pattern ②, as shown in FIG. 3A, the vehicle is stopped. Also, as shown in FIG. 3B, the front wiper is in the on state and the external temperature is equal to or less than 0° C. Therefore, a step S45 is executed through the step S10 of the flow of FIG. 2. In the step S45, as shown in FIG. 3D, the environment determining section 51a determines that the snow accretion is not increased and the accreted snow is melt due to the radiation heat from the engine, because the snow is falling but the vehicle is stopped. Also, the environment determining section 51a determines that the melt snow does not flows as water but becomes ice, because the external temperature is equal to or less than 0° C. As a result, in the running pattern ②, the snow counter is decremented by a first value in accordance with the stop time of the vehicle, and the ice counter is incremented by a second value in accordance with the stop time of the vehicle. However, as shown in FIG. 3E, the snow counter value and the ice counter value are both less than the threshold values, in the time of running pattern ②. Therefore, the sensitivity degradation determining section 51b determines that the sensitivity degradation of the radar apparatus is not caused (Step S50). Subsequently, the control returns to the start without generating an alarm (step S62).

Next, in the time of running pattern ③, as shown in FIG. 3A, the vehicle is in the running state again. Also, as shown in FIG. 3B, the front wiper is in the off state and the external temperature is equal to or less than 0° C. Therefore, a step S44 is executed through the steps S10, S20, S32 of the flow of FIG. 2. As shown in FIG. 3D, in the step S44, the environment determining section 51a determines that neither snow nor rain falls. As a result, the environment determining circuit 51a determines that the melting of the snow accretion does not occur so that there is no influence of the radiation heat from the engine, because the vehicle is running in the external environment equal to or less than 0° C. Therefore, the processor 51 holds the three counter values, i.e., does not increment or decrement the snow counter, the ice counter and the water counter in the time of running pattern ③, as shown in FIG. 3E. Therefore, the sensitivity degradation determining section 51b determines that the sensitivity degradation of the radar system is not caused (Step S50). Subsequently, the control returns to the start without generating an alarm (step S62).

Next, in the time of running pattern ④, as shown in FIG. 3A, the vehicle is in the running state. Also, as shown in FIG. 3B, the front wiper is in the on state and the external temperature is 5° C. Therefore, a step S43 is executed through the steps S10, S20, S30 of the flow of FIG. 2. In the step S43, the environment determining section 51a determines that rain falls, as shown in FIG. 3D. As a result, the snow counter is decremented by a third value. The ice counter is incremented by a fourth value in correspondence to the decrement of the snow counter and decremented by a fifth value. The water counter is incremented in correspondence to the decrement of the ice counter. As shown in FIG. 3E, the accreted snow on the radome 80 is melt into the iced water and the iced water is converted into water in the time of running pattern ④, because the external temperature is high so that rain falls (Step S50). Therefore, the sensitivity degradation determining section 51b that the sensitivity degradation of the radar apparatus is not caused because the counters do not exceed the threshold values. Subsequently, the control returns to the start without generating an alarm (step S62).

Next, in the time of running pattern ⑤, the external temperature falls down to 1° C. from the state of running pattern ④. Therefore, a step S42 is executed through the steps S10, S20, S30 of the flow of FIG. 2. As shown in FIG. 3D, in the step S42, the environment determining section 51a determined that the rain changes into sleet. As a result, the ice counter is incremented by the fourth value in accordance with the running time. At this time, the ice counter value is less than the threshold value. Therefore, the sensitivity degradation determining section 51b determines that the sensitivity degradation of the radar apparatus is not caused, because the counters do not exceed the threshold values. Subsequently, the control returns to the start without generating an alarm (step S62).

Next, in the time of running pattern ⑥, as shown in FIG. 3A, the vehicle is in the running state but is in traffic congestion. Also, as shown in FIG. 3B, the front wiper is in the off state and the external temperature is 1° C. Therefore, the step S45 is executed throug the step S10 of the flow of FIG. 2. As shown in FIG. 3D, in the step S45, the environment determining section 51a determines that the sleet stopped. Also, the environment determining section 51a determines that the accreted snow and ice on the radome 80 are melt, because the detected car speed is low-speed so that the wind on the running is not strong. As a result, as shown in FIG. 3E, the snow counter is decremented by the third value. The ice counter is incremented by the fourth value in correspondence to the decrement of the snow counter and decremented by the fifth value. The water counter is incremented. At this time, it is supposed that the ice counter value exceeds the threshold value in the time of running pattern ⑥ (Step S50). The sensitivity degradation determining section 51b determines that the sensitivity degradation of the radar apparatus is caused. Subsequently, an warning message is displayed on the display section 75 at a step S60. For example, the warning message is displayed until the ice counter value becomes less than the threshold value due to the operation of the radome heater. Thus, it is notified to the driver of the vehicle that the sensitivity degradation of the radar apparatus is caused. Also, the heater control signal and/or the radome wiper control signal are outputted from the sensitivity degradation determining section 51b to the radome heater control unit 71 and the radome wiper control unit 72, respectively. Thus, the radome heater 82 is heated to melt the accreted snow or ice. The radome wiper removes the accreted snow from the radome. After that, the control returns to the start.

In this way, when the operation of the front wiper stops and the external temperature is higher, the state change of the accretion of snow or ice on the radome can be evaluated based on the running environment and the time. The sensitivity degradation of the radar apparatus can be dynamically estimated based on the evaluating result. Thus, it is possible to carry out a snow accretion removal operation without wasteful power consumption.

It should be noted that in the above embodiments, the single threshold value is set to each of the snow accretion counter, the ice counter and the water counter. However, two threshold values for the radome heater and the radome wiper may be provided to each of the snow counter, the ice counter and the water counter. In this case, the operations of the radome heater 81 and the radome wiper 82 are controlled based on the two threshold values and the counter value. For example, when the snow or ice counter value exceeds a lower level of the two threshold values, the radome heater 81 is operated to promote the melting of the accreted snow. Also, when the snow or ice counter value rises and exceeds an upper level of the two threshold values, the radome wiper 82 is operated to remove the ice. Thus, it is possible to control the radome heater 81 and the radome wiper 82 based on the combination of the external temperature, the running state of the vehicle, and each counter value.

Also, only ON/OFF state of the switch of the front wiper is used in the above description for simplification of the description. However, for example, a snowfall quantity per unit time may be estimated in accordance with the speed of the front wiper or the time period of the intermittent operation of the front wiper. In this case, the incremental or decremental component of the snow or ice counter may be changed based on the operation speed of the front wiper. Also, in the snowfall state equal to or less than 0° C., the snow accretion counter value may be incremented or decremented in accordance with external temperature.

In the above description, the present invention is applied to a FM-CW multi-beam radar apparatus using a radio wave beam in the millimeter wave band as an example. However, the present invention is not limited only to the above embodiments. For example, the present invention can be applied to other radar apparatus such as a pulse radar apparatus and a scan beam radar apparatus.

According to the present invention, the snowfall and the quality of snow can be estimated without any complicated structure of the radar system.

What is claimed is:

1. A radar system mounted on a vehicle comprising:
   a radar apparatus;
   a radome provided for said radar apparatus,
   a front wiper;
   a wiper operation detector detecting an operation of said front wiper;
   a temperature detector detecting temperature outside of said vehicle; and
   a processing unit estimating whether sensitivity of the radar apparatus has degraded directly based on detecting results of said wiper operation detector and said temperature detector.

2. A radar system mounted on a vehicle according to claim 1, further comprising an output unit, and
   wherein said processing unit notifies a driver of the vehicle that the sensitivity of said radar apparatus has degraded, via said output unit based on the estimating result.

3. A radar system mounted on a vehicle comprising:
   a radar apparatus;
   a radome provided for said radar apparatus;
   a front wiper;
   a wiper operation detector detecting an operation of said front wiper;
   a temperature detector detecting temperature outside of said vehicle;
   a processing unit estimating whether sensitivity of the radar apparatus has degraded based on detecting results of said wiper operation detector and said temperature detector;
   a radome heater provided for said radome; and
   a radome heater control circuit controlling said radome heater to be turned on in response to a heater control signal, and
   wherein said processing unit outputs said heater control signal to said radome heater control circuit when it is estimated that the sensitivity of said radar apparatus has degraded.

4. A radar system mounted on a vehicle comprising:
   a radar apparatus;
   a radome provided for said radar apparatus;
   a front wiper;
   a wiper operation detector detecting an operation of said front wiper;
   a temperature detector detecting temperature outside of said vehicle;
   a processing unit estimating whether sensitivity of the radar apparatus has degraded based on detecting results of said wiper operation detector and said temperature detector;

a radome wiper provided for said radome; and a radome wiper control circuit controlling said radome wiper to be turned on in response to a wiper control signal, and wherein said processing unit outputs said wiper control signal to said radome wiper control circuit when it is estimated that the sensitivity of said radar apparatus has degraded.

5. A radar system mounted on a vehicle comprising:

a radar apparatus;

a radome provided for said radar apparatus;

a front wiper;

a wiper operation detector detecting an operation of said front wiper;

a temperature detector detecting temperature outside of said vehicle; and a processing unit estimating whether sensitivity of the radar apparatus has degraded based on detecting results of said wiper operation detector and said temperature detector;

said processing unit comprising:

a first counter;

a first estimating section estimating whether snow falls, based on the detecting result of said wiper operation detector and the detecting result of said temperature detector, and incrementing said first counter when it is estimated that the snow falls; and a second estimating section estimating whether the sensitivity of said radar apparatus has degraded, based on a value of said first counter.

6. A radar system mounted on a vehicle according to claim 5, wherein said processing unit further comprises a second counter, and wherein said first estimating section estimates whether sleet falls, based on the detecting result of said wiper operation detector and the detecting result of said temperature detector, and increments said second counter when it is estimated that the sleet falls, and said second estimating section estimates whether the sensitivity of said radar apparatus has degraded, based on said first counter value and a value of said second counter.

7. A radar system mounted on a vehicle according to claim 6, wherein said first estimating section estimates whether rain falls, based on the detecting result of said wiper operation detector and the detecting result of said temperature detector, decrements said first and second counters by first and second values, respectively, and also increments said second counter by a third value, when it is estimated that the rain falls; and said second estimating section estimates whether the sensitivity of said radar apparatus has degraded, based on said first and second counter values.

8. A radar system mounted on a vehicle comprising:

a radar apparatus;

a radome provided for said radar apparatus;

a front wiper;

a wiper operation detector detecting an operation of said front wiper;

a temperature detector detecting temperature outside of said vehicle;

a speed detector detecting a running speed of said vehicle; and a processing unit estimating whether sensitivity of the radar apparatus has degraded based on detecting results of said wiper operation detector, said temperature detector and said speed detector.

9. A radar system mounted on a vehicle according to claim 8, further comprising an output unit, and wherein said processing unit notifies a driver of the vehicle that the sensitivity of said radar apparatus has degraded, via said output unit based on the estimating result.

10. A radar system mounted on a vehicle according to claim 8, further comprising:

a radome heater provided for said radome; and a radome heater control circuit controlling said radome heater to be turned on in response to a heater control signal, and wherein said processing unit outputs said heater control signal to said radome heater control circuit when it is estimated that the sensitivity of said radar apparatus has degraded.

11. A radar system mounted on a vehicle according to claim 8, further comprising:

a radome wiper provided for said radome; and a radome wiper control circuit controlling said radome wiper to be turned on in response to a wiper control signal, and wherein said processing unit outputs said wiper control signal to said radome wiper control circuit when it is estimated that the sensitivity of said radar apparatus has degraded.

12. A radar system mounted on a vehicle according to claim 8, wherein said processing unit comprises:

a first counter;

a first estimating section determining whether said vehicle runs faster than a predetermined speed, estimating whether snow falls based on the detecting results of said wiper operation detector and said temperature detector, incrementing said first counter when it is determined that said vehicle runs faster than said predetermined speed and when it is estimated that the snow falls, and decrementing said first counter when it is determined that said vehicle does not run faster than said predetermined speed; and a second estimating section estimating whether the sensitivity of said radar apparatus has degraded, based on a value of said first counter.

13. A radar system mounted on a vehicle according to claim 12, wherein said processing unit further comprises a second counter, and wherein said first estimating section estimates whether sleet falls, based on the detecting results of said wiper operation detector and said temperature detector, increments said second counter when it is estimated that the sleet falls, and decrements said first and second counters, and increments said second counter by a quantity corresponding to the decrement of said first counter, when it is determined that said vehicle does not run faster than said predetermined value; and said second estimating section estimates whether the sensitivity of said radar apparatus has degraded, based on said first counter value and a value of said second counter.

14. A radar system mounted on a vehicle according to claim 13, wherein said first estimating section estimates whether rain falls based on the detecting results of said wiper operation detector and said temperature detector, decrements said first and second counters by first and second values, respectively, and also increments said second counter by a third value, when it is estimated that the rain falls or when it is determined that said vehicle does not run faster than said predetermined value; and said second estimating section estimates whether the sensitivity of said radar apparatus has degraded, based on said first and second counter values.

15. A method of minimizing sensitivity degradation of a radar apparatus mounted on a vehicle, comprising steps of:

incrementing or decrementing first and second counters based on weather and running speed of said vehicle, said first counter indicating a snow accretion on a radome for said radar apparatus and said second counter indicating an ice accretion on said radome;

comparing a value of each of said first and second counters with at least one threshold value; and removing snow or ice from radome based on a result of said comparing step.

16. A method according to claim 15, further comprising a step of notifying a driver of the vehicle that the sensitivity of said radar apparatus has degraded, based on the comparing result.

17. A method according to claim 15, wherein said removing includes:

heating a radome heater provided for said radome.

18. A method according to claim 15, wherein said removing includes:

driving a radome wiper provided for said radome.

19. A method according to claim 15, wherein each of said first and second counters includes a plurality of threshold values, and wherein said removing step includes:

activating at least one of a radome heater and a radome wiper which are both provided for said radome, based on comparison of said first and second counter values and said plurality of threshold values.

20. A method according to claim 15, wherein said incrementing or decrementing step includes:

detecting temperature outside of said vehicle;

estimating whether or not snow falls, whether or not sleet falls, and whether or not rain falls to detect a falling state of snow, sleet or rain;

detecting said running speed of said vehicle; and incrementing or decrementing said first and second counters based on said running speed of said vehicle, said temperature and said falling state.

21. A method according to claim 20, wherein said estimating step includes:

detecting an operation of a front wiper of the vehicle; and detecting said falling state based on the detected operation of said front wiper and said temperature.

22. A method according to claim 20, wherein said incrementing or decrementing step includes:

decrementing said first and second counter by first and second values, respectively, when said vehicle does not run faster than a predetermined speed; and incrementing said second counter by a third value, when said vehicle does not run faster than said predetermined speed.

23. A method according to claim 20, wherein said incrementing or decrementing includes:

decrementing said first and second counter by first and second values, respectively, when said temperature is higher faster than a predetermined temperature; and incrementing said second counter by a third value, when said temperature is higher faster than said predetermined temperature.

24. A method according to claim 22, wherein said incrementing or decrementing includes:

incrementing said first counter when said vehicle runs faster than said predetermined speed and when snow falls.

25. A method according to claim 22, wherein said incrementing or decrementing includes:

incrementing said second counter when said vehicle runs faster than said predetermined speed and when sleet falls.

26. A method according to claim 20, wherein said incrementing or decrementing includes:

decrementing said first and second counter by first and second values, respectively, when said vehicle runs faster than a predetermined speed and when rain falls; and incrementing said second counter by a third value, when said vehicle runs faster than said predetermined speed and when rain falls.

* * * * *

UNITED STATES PATENT AND TRADEMARK OFFICE
CERTIFICATE OF CORRECTION

PATENT NO.    : 6,414,623B1
DATED         : July 2, 2002
INVENTOR(S)   : Jun Ashihara It is certified that error appears in the above-identified patent and that said Letters Patent is hereby corrected as shown below:

Drawings,
Sheet 4, in the block for reference numeral "54", change "FFI" to -- FFT -- (for "F"ast "F"ouier "T"ransform).

Column 1,
Line 16, after "vehicle" insert --, for example, --.
Line 18, after "catch" insert -- or detect --; change "in" to -- which is --.
Line 21, after "precision" insert a period; before "as" insert -- such system function --.
Line 30, change "wave" to -- waves --.
Line 55, change "melt" to -- once melted --.
Line 57, delete "once".

Column 2,
Line 23, before the period insert -- thereof --.
Line 26, before "removed" insert -- surely --
Line 28, change "an object" to -- a further object --.
Line 33, before the period insert -- at a high level --.

Signed and Sealed this

Eighteenth Day of February, 2003

JAMES E. ROGAN
*Director of the United States Patent and Trademark Office*

UNITED STATES PATENT AND TRADEMARK OFFICE
CERTIFICATE OF CORRECTION

PATENT NO.   : 6,414,623 B1
DATED        : July 2, 2002
INVENTOR(S)  : Jun Ashihara It is certified that error appears in the above-identified patent and that said Letters Patent is hereby corrected as shown below:

Drawings,
Sheet 4, in the block for reference numeral "54", change "FFI" to -- FFT -- (for "F"ast "F"ourier "T"ransform).

Column 1,
Line 16, after "vehicle" insert -- , for example, --.
Line 18, after "catch" insert -- or detect --; change "in" to -- which is --.
Line 21, after "precision" insert a period; before "as" insert -- such system functions --.
Line 30, change "wave" to -- waves --.
Line 55, change "melt" to -- once melted --.
Line 57, delete "once".

Column 2,
Line 23, before the period insert -- thereof --.
Line 26, before "removed" insert -- surely --.
Line 28, change "an object" to -- a further object --.
Line 33, before the period insert -- at a high level --.
Line 41, change "based on the detecting result" to -- based on the detecting results --.
Line 42, change "and the detecting result of the" to -- and the --.
Line 45, change "At this time" to -- In this case --.
Line 47, after "notifies" insert -- a driver of the vehicle --.
Line 47, delete "to, a driver".
Lines 52 and 60, delete "At this".
Lines 53 and 61, change "time" to -- In this case --.
Line 65, after the comma insert -- and --.

Column 3,
Line 5, change "In this case, the" to -- The --.
Line 6, before "further" insert -- may --; change "At this time" to -- In this case --.
Line 7, after "section" insert -- also --.
Line 11, change "The second" to -- Here, the second --.
Line 17, change "Also" to -- Here --.
Line 29, change "an temperature" to -- a temperature --.
Line 33, change "result of the" to -- results of the --; delete "detecting result of".
Line 34, change "the temperature" to -- temperature --; delete "detecting result of the".
Line 37, change "At this time" to -- In this case --.
Line 38, after "notifies" insert -- a driver of the vehicle --.
Line 39, delete "a driver".
Lines 44 and 52, delete "At this".
Lines 45 and 53, change "time" to -- In this case --.

UNITED STATES PATENT AND TRADEMARK OFFICE
CERTIFICATE OF CORRECTION

PATENT NO. : 6,414,623 B1
DATED : July 2, 2002
INVENTOR(S) : Jun Ashihara

It is certified that error appears in the above-identified patent and that said Letters Patent is hereby corrected as shown below:

Column 3 (cont'd),
Line 61, delete "the detecting result of".
Line 63, after "faster" insert -- than the predetermined speed --.
Line 66, before the period insert -- than the predetermined speed --.

Column 4,
Line 1, change "In this case, the" to -- The --.
Line 2, delete "At this".
Line 3, change "time" to -- In this case --.
Lines 11 and 21, change "faster." to -- faster than the predetermined speed. --.
Line 26, before "still" insert -- achieve --.
Line 28, before the comma insert -- at an appropriate level --.
Line 32, after "ice" insert -- accretion --.
Line 37, delete "to".
Line 44, after "provided" insert -- with -- ; change "At this time" to -- In this case --.
Line 47, after "based on" insert -- comparisons of --.
Line 48, change "values and" to -- values with --.
Line 51, after "snow" insert -- , sleet or rain --; delete ", whether or not sleet".
Line 52, delete "falls, whether or not rain falls".
Line 66, change "be" to -- involve --.
Line 67, delete "attained by".

Column 5,
Lines 2 and 4, delete "faster".
Line 6, change "be attained" to -- involve --.
Line 7, delete "by".
Lines 9 and 13, change "may be" to -- may --.
Lines 10 and 14, change "attained by" to -- involve --.
Line 25, change "of an" to -- an --.
Line 48, change "apparatus," to -- apparatus 1, --.
Line 49, change "a temperature" to -- an external temperature --.

Column 6,
Line 46, change "51$\alpha$" to -- 51 --.

Column 7,
Line 15, change "circuit 50" to -- circuit or processing section 50 --.
Line 24, change "corresponds" to -- correspond --.
Line 27, change "wave indicates" to -- wave, indicate --.
Line 34, before "components" insert -- the --.
Line 48, change "possible" to -- able --.

UNITED STATES PATENT AND TRADEMARK OFFICE
CERTIFICATE OF CORRECTION

PATENT NO. : 6,414,623 B1
DATED : July 2, 2002
INVENTOR(S) : Jun Ashihara

It is certified that error appears in the above-identified patent and that said Letters Patent is hereby corrected as shown below:

Column 7 (cont'd),
Line 62, before ""water"", insert -- liquid --; change "down in the weight" to -- off due to gravity --.
Line 65, change "forms" to -- form --.
Line 66, change "functions" to -- function --.

Column 8,
Line 1, before "solid" insert -- a --.
Line 2, change "are difficult to fall down in the" to -- do not readily fall off because of gravity --.
Line 3, delete "weight".
Line 4, after "snow" insert -- sometimes --.
Line 5, change "melt" to -- melted --.
Line 8, change "to degrade" to -- which degrades --.
Line 10, change "this reasons" to -- these reasons --.
Line 16, change "apparatus." to -- apparatus 1. --.
Line 32, change "If" to -- In the peripheral section of the radome, --.
Line 34, before "intensity" insert -- the --.
Line 35, change "10*d*" to -- 10*d* because penetration by the waves is prevented --.
Line 37, change "wave" to -- waves --.
Line 42, change "The processor" to -- Referring to FIG. 1, the processor --.
Line 46, change "state from" to -- state based on --.
Line 62, change "he" to -- the --.
Line 67, after "51*b*" insert a comma.

Column 9,
Line 12, change "snow fall" to -- snow falls --.
Line 14, delete "to".
Line 15, change "depends" to -- depend --.
Line 16, change "substance" to -- precipitation --.
Line 17, change "types of" to -- types, i.e., --; delete ")".
Line 18, after "temperature" insert -- , and --.
Line 20, change "types." to -- types of precipitation. --.
Line 24, change "inremental" to -- incremental --.
Lines 32 and 37, change "by" to -- of --.
Line 43, after "In" insert -- the --.
Line 46, change "on the" to -- encountered thereby, while the vehicle is --.
Line 65, change "melt" to -- melted --.

UNITED STATES PATENT AND TRADEMARK OFFICE
CERTIFICATE OF CORRECTION

PATENT NO.    : 6,414,623 B1
DATED         : July 2, 2002
INVENTOR(S)   : Jun Ashihara It is certified that error appears in the above-identified patent and that said Letters Patent is hereby corrected as shown below:

Column 10,
Line 1, change "melt" to -- melted --; change "flows" to -- flow --.
Line 45, change "melt" to -- melted --.
Line 49, after "51$b$" insert -- determines --.

Column 11,
Line 5, change "throug" to -- through --.
Line 10, change "melt" to -- melting --.
Line 20, change "an warning" to -- a warning --.
Line 59, after "only" insert -- an --.

Column 12,
Line 12, after the period insert the sentence -- The scope of the invention is indicated by the appended claims. --.
Line 17, change the comma to a semicolon.

Column 15,
Lines 25 and 28, before "includes" insert -- step --.

Column 16,
Lines 11, 19 and 37, change "counter" to -- counters --.
Lines 18 and 36, before "includes" insert -- step --.
Lines 21 and 23, delete "faster".
Line 26, before "includes" insert -- step further --.
Line 31, before "includes" insert -- step --.

Signed and Sealed this

Third Day of June, 2003

JAMES E. ROGAN
*Director of the United States Patent and Trademark Office*

UNITED STATES PATENT AND TRADEMARK OFFICE
CERTIFICATE OF CORRECTION

PATENT NO.        : 6,414,623 B1
APPLICATION NO. : 09/528725
DATED             : July 2, 2002
INVENTOR(S)       : Jun Ashihara It is certified that error appears in the above-identified patent and that said Letters Patent is hereby corrected as shown below:

Drawings,
Sheet 4, in the block for reference numeral "54", change "FFI" to -- FFT -- (for "F"ast "F"ourier "T"ransform).

Column 1,
Line 16, after "vehicle" insert -- , for example, --.
Line 18, after "catch" insert -- or detect --; change "in" to -- which is --.
Line 21, after "precision" insert a period; before "as" insert -- such system functions --.
Line 30, change "wave" to -- waves --.
Line 55, change "melt" to -- once melted --.
Line 57, delete "once".

Column 2,
Line 23, before the period insert -- thereof --.
Line 26, before "removed" insert -- surely --.
Line 28, change "an object" to -- a further object --.
Line 33, before the period insert -- at a high level --.
Line 41, change "based on the detecting result" to -- based on the detecting results --.
Line 42, change "and the detecting result of the" to -- and the --.
Line 45, change "At this tiume" to -- In this case --.
Line 47, after "notifies" insert -- a driver of the vehicle --.
Line 47, delete "to, a driver".
Lines 52 and 60, delete "At this".
Lines 53 and 61, change "time" to -- In this case --.
Line 65, after the comma insert -- and --.

Column 3,
Line 5, change "In this case, the" to -- the --.
Line 6, before "further" insert -- may --; change "At this time" to -- In this case --.
Line 7, after "section" insert -- also --.
Line 11, change "The second" to -- Here, the second --.
Line 17, change "Also" to -- Here --.
Line 29, change "an temperature" to -- a temperature --.
Line 33, change "result of the" to -- results of the --; delete "detecting result of".
Line 34, change "the temperature" to -- temperature --; delete "detecting result of the".
Line 37, change "At this time" to -- In this case --.
Line 38, after "notifies" insert -- a driver of the vehicle --.
Line 39, delete "a driver".
Lines 44 and 52, delete "At this".
Lines 45 and 53, change "time" to -- In this case --.
Line 60, change "result" to -- results --.

UNITED STATES PATENT AND TRADEMARK OFFICE
CERTIFICATE OF CORRECTION

PATENT NO.      : 6,414,623 B1
APPLICATION NO. : 09/528725
DATED           : July 2, 2002
INVENTOR(S)     : Jun Ashihara It is certified that error appears in the above-identified patent and that said Letters Patent is hereby corrected as shown below:

Column 3 (cont'd),
Line 61, delete "the detecting result of".
Line 63, after "faster" insert -- than the predetermined speed --.
Line 66, before the period insert -- than the predetermined speed --.

Column 4,
Line 1, change "In this case, the" to -- The --.
Line 2, delete "At this".
Line 3, change "time" to -- In this case --.
Lines 11 and 21, change "faster." to -- faster than the predetermined speed. --.
Line 26, before "still" insert -- achieve --.
Line 28, before the comma insert -- at an appropriate level --.
Line 32, after "ice" insert -- accretion --.
Line 37, delete "to".
Line 44, after "provided" insert -- with --; change "At this time" to -- In this case --.
Line 47, after "based on" insert -- comparisons of --.
Line 48, change "values and" to -- values with --.
Line 51, after "snow" insert -- , sleet or rain --; delete ", whether or not sleet".
Line 52, delete "falls, whether or not rain falls".
Line 66, change "be" to -- involve --.
Line 67, delete "attained by".

Column 5,
Lines 2 and 4, delete "faster".
Line 6, change "be attained" to -- involve --.
Line 7, delete "by".
Lines 9 and 13, change "may be" to -- may --.
Lines 10 and 14, change "attained by" to -- involve --.
Line 25, change "of an" to -- an --.
Line 48, change "apparatus," to -- apparatus 1, --.
Line 49, change "a temperature" to -- an external temperature --.

Column 6,
Line 46, change "51$\alpha$" to -- 51 --.

Column 7,
Line 15, change "circuit 50" to -- circuit or processing section 50 --.
Line 24, change "corresponds" to -- correspond --.
Line 27, change "wave indicates" to -- wave, indicate --.
Line 34, before "components" insert -- the --.
Line 48, change "possible" to -- able -- .

UNITED STATES PATENT AND TRADEMARK OFFICE
CERTIFICATE OF CORRECTION

PATENT NO.      : 6,414,623 B1
APPLICATION NO. : 09/528725
DATED           : July 2, 2002
INVENTOR(S)     : Jun Ashihara It is certified that error appears in the above-identified patent and that said Letters Patent is hereby corrected as shown below:

Column 7 (cont'd),
Line 62, before ""water"", insert -- liquid --; change "down in the weight" to -- off due to gravity --.
Line 65, change "forms" to -- form --.
Line 66, change "functions" to -- function --.

Column 8,
Line 1, before "solid" insert -- a --.
Line 2, change "are difficult to fall down in the" to -- do not readily fall off because of gravity --.
Line 3, delete "weight".
Line 4, after "snow" insert -- sometimes --.
Line 5, change "melt" to -- melted --.
Line 8, change "to degrade" to -- which degrades --.
Line 10, change 'this reasons" to -- these reasons --.
Line 16, change "apparatus." to -- apparatus 1. --.
Line 32, change "If" to -- In the peripheral section of the radome, --.
Line 34, before "intensity" insert -- the --.
Line 35, change "10$d$" to -- 10$d$ because penetration by the waves is prevented --.
Line 37, change "wave" to -- waves --.
Line 42, change "The processor" to -- Referring to FIG. 1, the processor --.
Line 46, change "state from" to -- state based on --.
Line 62, change "he" to -- the --.
Line 67, after "51$b$" insert a comma.

Column 9,
Line 12, change "snow fall" to -- snow falls --.
Line 14, delete "to".
Line 15, change "depends" to -- depend --.
Line 16, change "substance" to -- precipitation --.
Line 17, change "types of" to -- types, i.e., --; delete ")".
Line 18, after "temperature" insert -- , and --.
Line 10, change "types." to -- types of precipitation. --.
Line 24, change "inremental" to -- incremental --.
Lines 32 and 37, change "by" to -- of --.
Line 43, after "In" insert -- the --.
Line 46, change "on the" to -- encountered thereby, while the vehicle is --.
Line 65, change "melt" to -- melted --.

Column 10,
Line 1, change "melt" to -- melted --; change "flows" to -- flow --.

UNITED STATES PATENT AND TRADEMARK OFFICE
CERTIFICATE OF CORRECTION

PATENT NO. : 6,414,623 B1
APPLICATION NO. : 09/528725
DATED : July 2, 2002
INVENTOR(S) : Jun Ashihara It is certified that error appears in the above-identified patent and that said Letters Patent is hereby corrected as shown below:

Column 10 (cont'd),
Line 45, change "melt" to -- melted --.
Line 49, after "51$b$" insert -- determines --.

Column 11,
Line 5, change "throug" to -- through --.
Line 10, change "melt" to -- melting --.
Line 20, change "an warning" to -- a warning --.
Line 59, after "only" insert -- an --.

Column 12,
Line 12, after the period insert the sentence -- The scope of the invention is indicated by the appended claims. --.
Line 17, change the comma to a semicolon.

Column 15,
Lines 25 and 28, before "includes" insert -- step --.

Column 16,
Lines 11, 19 and 37, change "counter" to -- counters --.
Lines 18 and 36, before "includes" insert -- step --.
Lines 21 and 23, delete "faster".
Line 26, before "includes" insert -- step further --.
Line 31, before "includes" insert -- step --.

This certificate supersedes Certificate of Correction issued June 3, 2003.

Signed and Sealed this

Twenty-second Day of August, 2006

JON W. DUDAS
*Director of the United States Patent and Trademark Office*